United States Patent
Vrbanac et al.

(10) Patent No.: US 7,226,525 B2
(45) Date of Patent: *Jun. 5, 2007

(54) PROCESS FOR PRODUCING VERY LOW COD UNBLEACHED PULP

(75) Inventors: Michael D. Vrbanac, Seattle, WA (US); Brian Wester, Sumner, WA (US); Brian E. Dennis, Kamloops (CA); Peter K. Lau, Kamloops (CA); Julie A. Reimer, Seattle, WA (US); David W. Bickell, Kamloops (CA)

(73) Assignee: Weyehaeuser Company, Federal Way, WA (US)

( * ) Notice: Subject to any disclaimer, the term of this patent is extended or adjusted under 35 U.S.C. 154(b) by 395 days.

This patent is subject to a terminal disclaimer.

(21) Appl. No.: 10/209,446

(22) Filed: Jul. 30, 2002

(65) Prior Publication Data

US 2003/0213570 A1  Nov. 20, 2003

Related U.S. Application Data

(63) Continuation of application No. PCT/US02/15522, filed on May 15, 2002.

(51) Int. Cl.
D21C 9/02 (2006.01)
D21C 9/18 (2006.01)

(52) U.S. Cl. .................. 162/60; 162/17; 162/70; 162/71; 162/90

(58) Field of Classification Search .......... 162/60, 162/65, 56, 90, 231, 8, 17, 19, 70, 71, 145, 162/29, 14

See application file for complete search history.

(56) References Cited

U.S. PATENT DOCUMENTS

| | | | | |
|---|---|---|---|---|
| 2,030,383 A | * | 2/1936 | Luth et al. | 162/90 |
| 2,054,854 A | * | 9/1936 | Dreyfus | 162/76 |
| 2,645,576 A | * | 7/1953 | Bate et al. | 162/60 |
| 4,274,913 A | * | 6/1981 | Kikuiri et al. | 162/65 |
| 4,806,203 A | * | 2/1989 | Elton | 162/19 |
| 4,971,658 A | | 11/1990 | Henricson et al. | |
| 5,429,717 A | * | 7/1995 | Bokstrom et al. | 162/60 |
| 6,245,196 B1 | * | 6/2001 | Martin et al. | 162/11 |
| 2002/0112827 A1 | | 8/2002 | Merkley et al. | |

FOREIGN PATENT DOCUMENTS

WO  WO 95/20066 A1  7/1995
WO  WO 02/33164 A2  4/2002

OTHER PUBLICATIONS

"Forming Handsheets For Physical Tests of Pulp," *TAPPI*, T 205 sp-95, 1995 pp. 5-7.
"Moisture In Pulp, Paper and Paperboard," *TAPPI*, T 412 om-94, pp. 1-3.
Harper, S., and M. Grenggs, "Resin Extraction and Effects on Pulp Quality," *Proceedings of the 54th Appita Annual Conference*, Melbourne, Apr. 3-6, 2000, pp. 575-580.
Stromberg, C.B., "Washing For Low Bleach Chemical Consumption," in Thomas W. Joyce (ed.), *Environmental Issues: A TAPPI Press Anthology of Published Papers*, TAPPI Press, Atlanta, 1990 pp. 230-238.
Stromberg, C.B., Washing Of Dissolved Organic Solids From Pulp, *Paper Asia*, Oct. 1994, pp. 32-39.

* cited by examiner

*Primary Examiner*—Eric Hug
(74) *Attorney, Agent, or Firm*—Christensen, O'Connor, Johnson & Kindness

(57) ABSTRACT

A pulp product that has a low COD is comprised of an unbleached pulp that is soaked and washed in alkaline water for a sufficient time so that the COD after soaking and washing is less than or equal to 3.0 kg/1000 kg of dry pulp. The pulp is produced by repetitively soaking and washing an unbleached pulp in alkaline water that is never allowed to drop below pH 7.0. The pulp is soaked and washed for a total of at least 400 minutes at an elevated temperature to produce the pulp product that has a low COD.

13 Claims, 1 Drawing Sheet

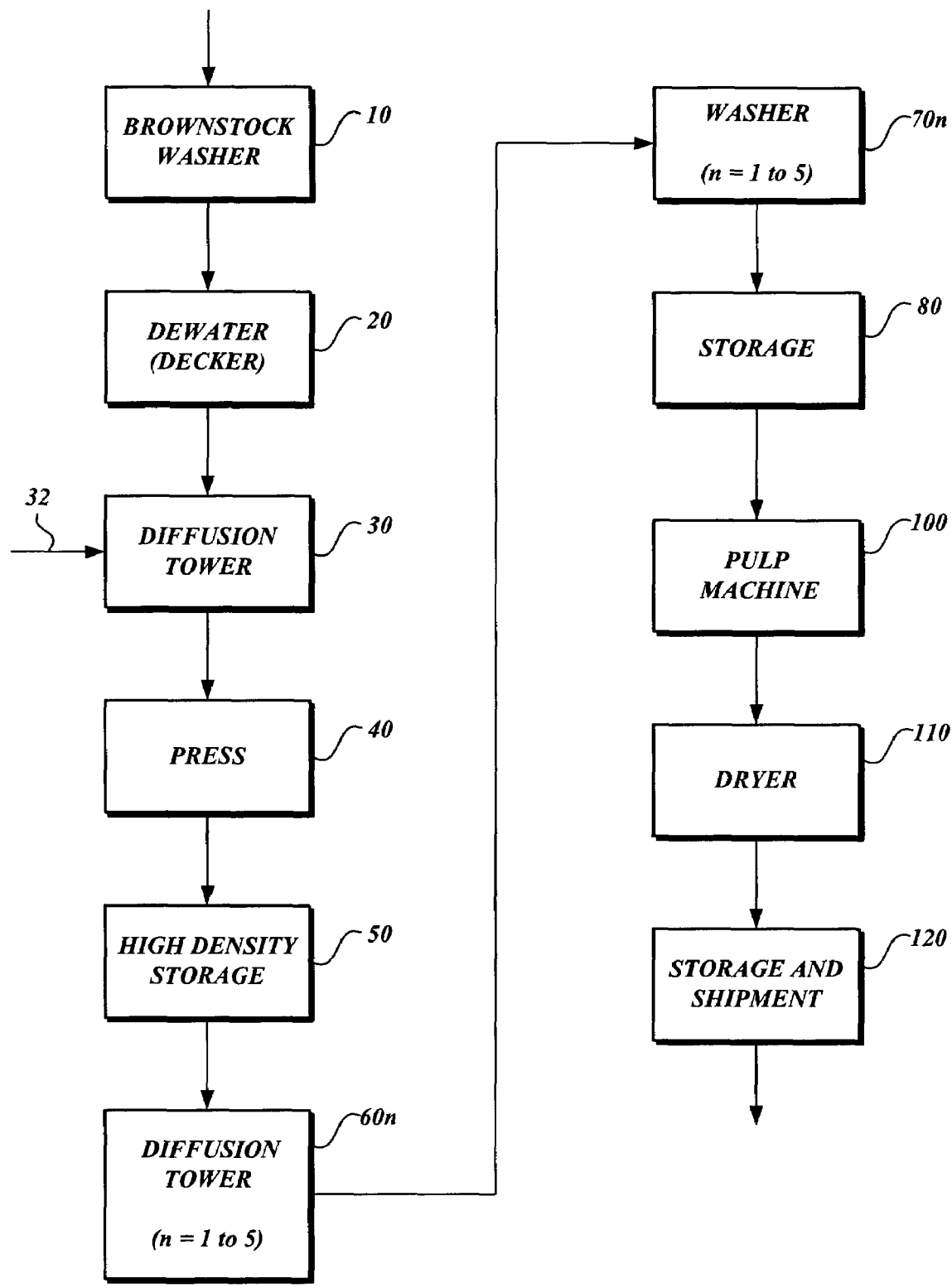

PROCESS FOR PRODUCING VERY LOW COD UNBLEACHED PULP

CROSS-REFERENCE TO RELATED APPLICATIONS

This application is a continuation of prior co-pending International Application No. PCT/US02/15522, filed May 15, 2002, the benefit of the filing date of which is hereby claimed under 35 U.S.C. § 120.

FIELD OF THE INVENTION

The present invention relates to cellulosic pulps, and more particularly, to unbleached cellulosic pulps having a low COD that are useful in cementitious products.

BACKGROUND OF THE INVENTION

The internal structures of houses and other buildings are commonly protected from environmental elements by exterior siding materials. These siding materials are typically planks or panels composed of wood, concrete, brick, aluminum, stucco, wood composites, or fiber-cement composites. A common fiber-cement composite is fiber-cement siding, which is generally composed of cement, silica sand, unbleached wood pulp, and various additives. Fiber-cement siding offers several advantages over other types of siding materials, such as wood siding: it is weatherproof, relatively inexpensive to manufacture, fire-resistant, and invulnerable to rotting or insect damage.

Commercial fiber-reinforced cement siding planks or panels are made using the Hatsheck process. The Hatsheck process was initially developed for the production of asbestos composites, but it is now used for the manufacture of non-asbestos, cellulose fiber reinforced cement composites. In this process, unbleached cellulose fibers are re-pulped in warm water at an alkaline pH of 11 to 12.5; the re-pulped fibers are refined and then mixed with cement, silica sand, and other additives to form a mixture. The fiber-cement mixture, is deposited on a felt band substrate, vacuum dewatered, and cured to form a fiber reinforced cement matrix in sheet form.

The curing of the cement matrix is hindered by the presence of sugars or other organic materials. These materials retard the hydration reaction of cement and thereby retard the setting or hardening of a mortar or concrete. Cement is purposely retarded in ready-mix concrete during long hours of transportation, for mitigation of stress due to temperature (heat) when used in a large-sized concrete structures, and for decorated washing finishes. When these organic materials are measured, the manufacturers of fiber-cement siding have observed an inverse relationship between the amount of these materials in an unbleached pulp and the strength properties of the final product. The amount of these materials is commonly measured using the chemical oxygen demand (COD) test. When considering the detrimental effect of these materials on strength properties, it is apparent that there are a needs in the art for very low COD unbleached pulp. The present invention fulfills these needs and provides further related advantages.

SUMMARY OF THE INVENTION

The present invention provides a pulp product comprising an unbleached pulp that is soaked and washed only in alkaline water, and after soaking and washing, it has a COD less than or equal to 3.0 kg/1000 kg of dry pulp, and preferably 1.7 to 2.8 kg/1000 kg. This pulp is produced by repetitively soaking unbleached pulp in alkaline water that is at an elevated temperature so that organics will diffuse out of the fiber and into the water. Subsequently, the repetitively soaked and washed pulp is then preferably dewatered and dried.

BRIEF DESCRIPTION OF THE DRAWINGS

The foregoing aspects and many of the attendant advantages of this invention will become more readily appreciated as the same become better understood by reference to the following detailed description and the accompanying drawings, wherein:

FIG. 1 illustrates the steps of the caustic washing process for the present invention.

DETAILED DESCRIPTION OF THE PREFERRED EMBODIMENT

The present invention provides a low chemical oxygen demand (COD) pulp that is particularly useful for reinforcing fiber cement products. The low COD cellulosic pulp that is useful in the present invention is most preferably an unbleached pulp from a kraft pulping process. However, a wide variety of pulped cellulosic fibers can be used, which are derived from wood and non-wood sources. Of all the pulp sources, wood pulp is the most commonly employed because of its availability and price.

To obtain suitable wood pulp fibers, the sulfate pulping process is the most preferred method. Using this process and considering the desired composite properties, the preferred wood fiber source is long-fibered coniferous wood species. Examples of these species include the following: Southern pine, Douglas fir, spruce, hemlock, and Radiata pine. In addition to these wood fiber sources, other chemical pulps can be used that include pulps made from short or long fibered wood species or recycled, wood pulp fibers. Short wood fibers, which are typically produced from hardwood species such as eucalyptus, can also be used. The processes to produce these wood pulp fibers are well-known to those skilled in the art of pulp manufacturing. These fibers are commercially available from a number of companies, including the Weyerhaeuser Company. In contrast to wood pulp fiber sources, there are other natural cellulosic fiber sources which include straw, flax, kenaf, hemp, or similar materials. Like wood-based fibers, these non-wood fibers may also be pulped and subsequently used in fiber cement-based composites.

Referring to FIG. 1, unbleached pulp, preferably unbleached kraft pulp, is first passed through conventional brown stock washers 10 and a brown stock decker 20 at a consistency of approximately 10% when it exits from the decker. Prior to washing, the unbleached pulp that is used in the present invention must have a relatively low Kappa number. Preferably the Kappa number is less than or equal to 30, but it is more preferably less than or equal to 25±3. The unbleached pulp from the decker is at an alkaline condition and must be maintained at an alkaline condition (pH equal to or greater than 7.0) while it is processed in accordance with the present invention. The unbleached pulp from the decker, which is at a consistency of approximately 10%, is initially soaked in the first diffusion tower 30 at an alkaline condition for a predetermined length of time and a predetermined elevated temperature. This first soaking step is preferably conducted at a temperature of at least 60° C., and more preferably at approximately 65° C. or higher. The pulp is soaked in tower 30 preferably for at least 120 minutes. After tower 30, the pulp is washed and dewatered in press 40. However, this dewatering step is optional, but if it is employed, then the pulp may preferably be dewatered to a consistency of approximately 30%.

After the initial step in which the pulp in tower 30 has been soaked and dewatered, the pulp is again diluted to a 10% consistency it is then sent to a set of successive diffusion and washing steps. Optionally, the pulp can be placed in a high density storage tank 50 in which it can reside anywhere from 0 to 430 minutes. However, if the high density storage tank is employed during normal operation, the pulp will reside in the tank for approximately 100 minutes. The purpose of the high density storage tank is to prevent diffusion tower flow variations from passing to the downstream processes that are after the storage tank.

After the high density storage tank, the pulp is then introduced into the first of a series 60n of diffusion tanks at a consistency of approximately 10%. Hot water and steam or only steam are added to the pulp in a second of the series 60n of diffusion tanks to raise the temperature to a value that is preferably equal to or greater than 80° C. The pulp is then repetitively soaked in the remaining series 60n of diffusion towers. After soaking in each tower 60n, the pulp is subjected to washing in successive washers 70n. Preferably the pulp is soaked and washed five times in towers 60n and washers 70n before it is forwarded to a storage tank 80. Each of the successive soaking and diffusion steps may take a minimum of 30 minutes but may take up to 100 or more minutes. These time periods include the washing steps that follow each soaking step. It is preferred that the repetitive soaking steps in diffusion towers 60n occur for a total of at least 280 minutes but preferably 335 minutes and in either case at the elevated temperature of at least 80° C. It is preferred that the total soaking time in diffusion tower 30, storage vessel 50, and diffusion towers 60n ranges from a minimum of 400 minutes (120 minutes in diffusion tower 30, 0 minutes in vessel 50, 280 minutes in diffusion towers 60n) to a maximum of approximately 1,050 minutes (120 minutes in diffusion tower 30, 430 minutes in vessel 50, 500 minutes in diffusion towers 60n). Conventionally, however, the soak will occur for approximately 555 minutes (120 minutes in diffusion tower 30, 100 minutes in vessel 50, 335 minutes in diffusion towers 60n).

After the pulp has been repetitively soaked and washed, it is forwarded to the storage tank 80. In this storage tank, the pulp remains at a consistency of about 10%. Thereafter, the pulp is fed in a conventional manner to a conventional pulp machine 100 and dryer 110. After the pulp is dried into sheets, it is cut to size, sent to storage 120, and ultimately shipped to a customer.

The unbleached and washed pulp produced by the process of the present invention has a COD of less than or equal to 3.0 kg per metric ton (1,000 kg), and preferably less than 1.7 to 2.8 kg/1000 kg. This level of COD is well below that achieved in ordinary pulp mills and particularly in kraft pulp mills.

A critical feature of the present invention is that the pulp must be maintained at alkaline conditions from the time it begins the initial soaking in tower 30 until the pulp is dried. It is preferred that the pH be maintained at or above 7.0 throughout the entire process, from the soaking in the initial diffusion tower 30 through the repetitive soaks in towers 60n. Preferably in these steps, the pH is maintained in the range of from 10.0 to 11.0. The pulp is then run through the pulp machine 100 and the dryer 110. In these steps, the pH may be reduced, e.g., to 8.0 to 8.5, but can be run lower. Under certain circumstances, it may be necessary to add caustic solution (20% by weight aqueous sodium hydroxide) to the first diffusion tower 30. It has been found that the addition of caustic at the rate of at least 2 kg per metric ton, and more preferably 3 kg per metric ton, will be sufficient to maintain the alkalinity of the pulp above pH 7.0 throughout the process. It is only necessary to add caustic during the initial portion of the run of the process. For example, at a throughput of about 40 to 50 tons per hour, the caustic needs to be added at the rate of 3 kg per metric ton for the initial 24 to 48 hour period that the pulp is run through the initial tower 30. This will assure that the alkalinity will be maintained above pH 7.0 throughout the entire process, which includes the drying stage.

In the most preferred embodiment, the present invention is carried out in a converted oxygen delignification and bleaching plant that is normally associated with a Kraft pulp mill, which is used to convert unbleached pulp to bleached pulp. A typical bleach plant comprises an oxygen delignification reactor that is followed by a series, typically five, of bleach reactors, in which various bleaching agents such as chlorine dioxide are added. In accordance with the present invention, the bleach plant is converted to use with the present invention by first cutting off the supply of oxygen to the oxygen reactor, and thereafter, the supply of bleaching agents to the bleach reactors is sequentially shut off as the pulp (with no oxygen added) sequentially enters the bleach reactors.

In this preferred embodiment, the oxygen reactor becomes the first diffusion tower 30. At the same time that oxygen is cut off from the diffusion tower, caustic is introduced into the pulp via line 32 at the rates set forth above. In the preferred mode of operation, the pulp is resident in the oxygen reactor (tower 30) for approximately 120 minutes. The pulp is then run through the press that is typically associated with the oxygen reactor (tower 30) to increase the consistency from approximately 10% to approximately 30%. The pulp is then diluted to 10% consistency and introduced into a high density storage vessel (vessel 50). The vessel is normally operated at a partial capacity so that the pulp residence time in the storage vessel is approximately 100 minutes.

The pulp is then introduced into the first bleach reactor vessel (towers 60n) that is one of five total. Steam and hot water are added to the pulp when the pulp enters the second of the series 60n of reactor vessels to raise the temperature of the pulp to 80° C. or higher. Depending on the size of the vessel, the residence time for the pulp will vary. In one particular plant, the residence time in the five bleach reaction vessels was on the order of 60 minutes, 30 minutes, 45 minutes, 100 minutes, and 100 minutes, respectively. This residence time is dependent on the size of the successive reactors. It is very important in this cycle that the temperature be maintained at or above 80° C. This is accomplished by adding steam to the vessels, as necessary, to maintain temperatures. After soaking in each bleach reactor vessel, the pulp is run through conventional washing unit (washers 70n) that normally following each of the bleach reactors. Preferably, fresh water is used to wash the pulp; however, white water from the associated pulp plant may be used, if necessary.

After the pulp from the fifth bleach reaction vessel is washed, it is placed into the vessel that is normally used for bleached pulp storage (vessel 80). It is thereafter diluted in successive steps to a consistency of about 1.5% and fed into a pulp head box on the pulp machine 100. The dewatered sheet produced on the pulp machine is then run through the pulp dryer 110, for example, a Flakt dryer. After drying, the sheet is subsequently cut, stacked, stored, and, thereafter sent to shipping operations.

If desired, the pulp machine and pulp dryer can be eliminated and the pulp can be introduced directly into a jet dryer. The jet dryer produces a dried singulated fiber, particularly useful in some cementitious products. One suitable jet dryer for use in the present invention is a fluid energy Aljet Model Thermajet, X0870L, manufactured by Fluid Energy Processing and Equipment Company. It is also possible to completely skip the drying stage and use the pulp in a never-dried state.

EXAMPLE

The following example is intended for illustrative purposes only and is not intended to in any way delimit the invention. Chemical oxygen demand (COD) is determined by the following method. Pulp sheets produced in accordance with the preferred embodiment of the present invention just described are torn or cut into small pieces (approximately 4 cm square). The small pieces are mixed and the moisture is measured in accordance with Tappi procedure T412 om-94. Forty grams of pulp, oven dried weight, are then carefully weighed. A 2,000 ml solution of 0.01 N sodium hydroxide solution is prepared using distilled or deionized water and analytical grade sodium hydroxide. Thereafter, the pulp is placed in 2,000 ml of the 0.01 N sodium hydroxide solution and placed in a disintegrater and disintegrated for 15 minutes at 3,000 rpm in a British Pulp Evaluation Apparatus (or British disintegrater) described in Tappi 505 sp-95. The pulp slurry is then vacuum filtered immediately after disintegration using a Whatman No. 3 filter paper. The filtration time is long enough so that a majority of the filtrate is passed through the filter. Two hundred and fifty ml of filtrate is separated for COD analysis. A sample is preserved with 2.5 ml of 50% sulfuric acid. Thereafter, the COD of the filtrate is measured using the titration method described in *Standard Methods for the Examination of Water and Wastewater*, 20th Edition, 1998, Method #5220C, "Closed Reflux, Titrimetric Method". The COD content is then calculated as kilograms per metric ton of pulp based on the oven dried weight of the pulp.

The pulp samples were randomly selected from several production runs through the converted oxygen delignification and bleach plant described above. Unbleached pulp was run at the rate of 45 tons per hour through the converted oxygen delignification and bleach plant. Residence time in the oxygen reactor vessel was on the order of 120 minutes. Residence times in the successive bleach vessels was 60, 35, 45, 100, and 100 minutes respectively. Pulp samples were taken during production runs downstream from the Flakt pulp dryer and tested for COD as set forth above. Samples A, B, C, D, and E were taken over a three-day treatment period. Samples C5, C7, C9, C11, and C13 were taken over a nine-day treatment period. The results are set forth below.

| SAMPLE ID | COD (kg/metric ton) |
|---|---|
| E | 2.34 |
| C13 | 2.36 |
| C | 2.53 |
| B | 2.54 |
| C11 | 2.55 |
| A | 2.63 |
| D | 2.73 |
| C7 | 2.75 |
| C5 | 2.78 |
| C9 | 2.85 |

The pulp produced in accordance with the foregoing example was incorporated into cementitious products at about 8% by weight pulp using the Hatsheck process. (The pulp content may be varied from 6% to 10% by weight if desired.) Cement panels and planks were produced for use in residential and commercial construction. Tilebacker boards used for ceramic tile underlayment were also produced. All of these products exhibited excellent strength characteristics.

While the preferred embodiment of the invention has been illustrated and described, it will be appreciated that various changes can be made therein without departing from the spirit and scope of the invention.

The invention claimed is:

1. A process for making a low COD pulp, comprising:
   (a) repetitively soaking and washing unbleached pulp containing sugars and other organic materials in water that is maintained at alkaline conditions such that said pulp is soaked for a total of at least 400 minutes at an elevated temperature to produce a pulp product having the sugars and other organic products reduced such that the pulp product has a COD of less than or equal to 3.0 kg per 1000 kg;
   (b) adding alkali to said pulp while soaking and washing; and
   (c) dewatering and drying said pulp while maintaining said alkaline conditions.

2. The process of claim 1, wherein the first soaking step is carried out at a first elevated temperature of at least 60° C. and at least some of the later soaking steps are carried out at a second elevated temperature of at least 80° C.

3. The process of claim 2, wherein the soaking steps are repeated up to five times.

4. The process of claim 3, wherein the washing and dewatering steps are carried out in a plant previously used for oxygen delignification and pulp bleaching; the first soaking step is conducted in a converted oxygen reactor and the subsequent soaking steps are carried out in successive converted bleach reactors; and adding said alkali to said oxygen reactor along with said unbleached pulp to neutralize residual acid in said bleaching plant.

5. The process of claim 4, wherein alkali is added at the rate of 3 kg per 1000 kg of dry unbleached pulp for a limited amount of time.

6. The process of claim 4, wherein said alkali is added for at least the first 24 hours during which pulp is introduced into said oxygen reactor.

7. The process of claim 6, wherein said alkali is introduced for on the order of the first 48 hours unbleached during which pulp is introduced into said oxygen reactor.

8. The process of claim 1, wherein said unbleached pulp has a Kappa number of $\leq 30$.

9. The process of claim 8, wherein said unbleached pulp has a Kappa number of 25±3.

10. The process of claim 9, wherein said Kappa number is ≦25.

11. The process of claim 1, wherein said pulp is maintained at a pH greater than or equal to 7.0 while being dried.

12. The process of claim 1, comprising the step of soaking said unbleached pulp in water under alkaline conditions and dewatering said pulp before repetitively soaking and washing said pulp.

13. The process of claim 12, comprising the step of dewatering and drying said pulp after repetitively soaking and washing said pulp.

* * * * *